United States Patent [19]
Miyanaga

[11] Patent Number: 5,284,409
[45] Date of Patent: Feb. 8, 1994

[54] EXPANSION ANCHOR FOR ENGAGEMENT IN A HOLE

[75] Inventor: Masaaki Miyanaga, Ashiya, Japan

[73] Assignee: Kabushiki Kaisha Miyanaga, Miki, Japan

[21] Appl. No.: 926,456

[22] Filed: Aug. 7, 1992

[30] Foreign Application Priority Data

| Aug. 20, 1991 | [JP] | Japan | 3-065775 |
| Aug. 20, 1991 | [JP] | Japan | 3-065776 |
| Apr. 27, 1992 | [JP] | Japan | 4-027563 |

[51] Int. Cl.$^5$ .............................................. F16B 13/06
[52] U.S. Cl. .................................... 411/55; 411/60; 411/65
[58] Field of Search ............... 411/21, 55, 60, 61, 411/63–65

[56] References Cited

U.S. PATENT DOCUMENTS

| 4,519,735 | 5/1985 | Machtle | 411/65 |
| 4,611,485 | 9/1986 | Leslie | 411/65 |
| 4,613,264 | 9/1986 | McIntyre et al. | 411/65 |

FOREIGN PATENT DOCUMENTS

| 227595 | 2/1988 | European Pat. Off. |
| 365475 | 4/1990 | European Pat. Off. |
| 416183A1 | 3/1991 | European Pat. Off. |
| 416193 | 3/1991 | European Pat. Off. |
| 2848478 | 6/1979 | Fed. Rep. of Germany | 411/64 |
| 215623 | 5/1924 | United Kingdom |

OTHER PUBLICATIONS

European Patent Office Search Report, dated Nov. 26, 1992, in a companion patent application.

Primary Examiner—Neill R. Wilson
Attorney, Agent, or Firm—Marshall, O'Toole, Gerstein, Murray & Borun

[57] ABSTRACT

An anchor comprising a core including first and second ends and a cylindrical portion between said ends, the first end including means for engaging with a body to be anchored, and the second end terminating in a portion which is enlarged gradually. A sleeve engages telescopically around the cylindrical portion and has an end adjacent the second end of the core. Expanders which normally form an annulus when positioned together are provided, the annulus engaging slidably with the cylindrical portion. Each of the expanders has an engaging end which abuts on and engages with the end of the sleeve. Means is provided on the expanders for at least provisionally binding them around the core.

6 Claims, 4 Drawing Sheets

Fig. 5
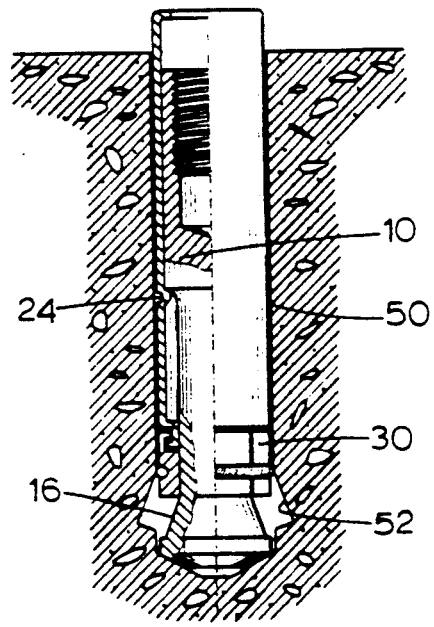
Fig. 6
Fig. 7
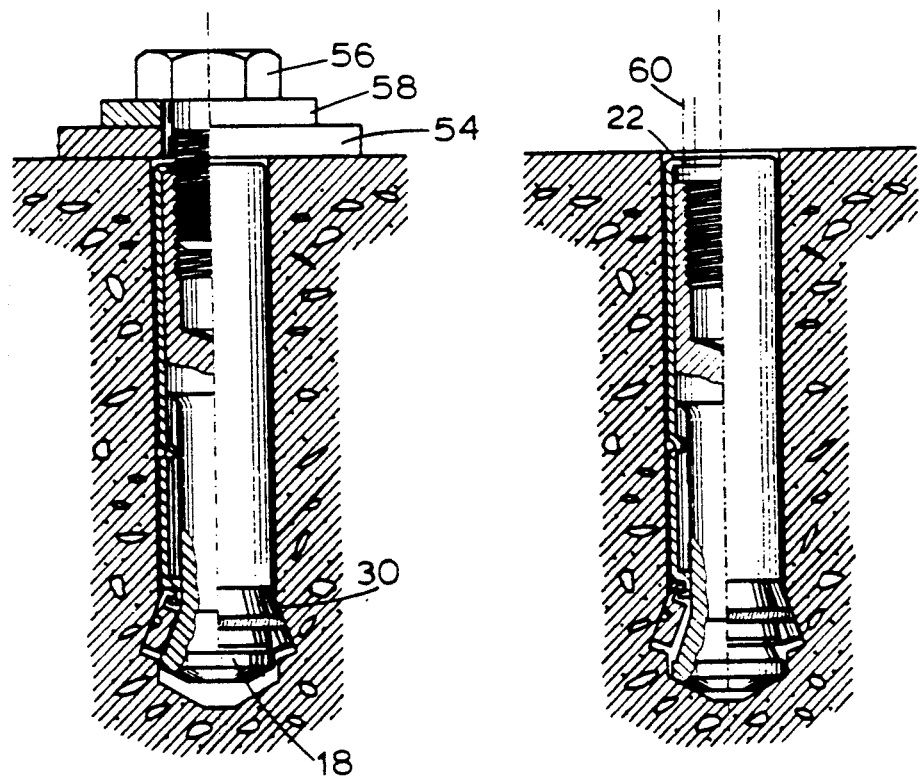

EXPANSION ANCHOR FOR ENGAGEMENT IN A HOLE

FIELD AND BACKGROUND OF THE INVENTION

The present invention relates to an anchor having expanders for engaging an undercut portion of a hole in concrete or the like.

European Patent Publication No. 0,416,183 A1 dated 13 March 1991 (K. K. MIYANAGA) exemplifies, particularly in FIG. 6, an anchor having an expansion sleeve 202 expanded around a conical surface 109 of a bolt 203. Because the expanded sleeve 202 is plastically deformed into an undercut portion of a hole in, for example, concrete, it is not possible to remove the bolt 203 from concrete for replacement when the bolt is corroded or damaged.

It is a general object of the present invention to provide an anchor which may be removed from a hole after it is embedded in the hole.

SUMMARY OF THE INVENTION

An anchor according to this invention comprises:

a core including a cylindrical portion, which has means for engaging with a body to be anchored adjacent one end, and which terminates at its other end in a portion enlarged gradually;

a sleeve engaging telescopically with the cylindrical portion and having an end adjacent the other end of the core;

expanders normally forming an annulus together, which slidably engage with the cylindrical portion, each of the expanders having an end adjacent the one end of the core, which is adapted to abut on and hang from the end of the sleeve; and means on the expanders for binding them around the core at least provisionally.

BRIEF DESCRIPTION OF THE DRAWINGS

The invention will be better understood from the accompanying drawings which show preferred embodiments of the invention, wherein:

FIGS. 5–7 are side views partially in axial section showing the anchor of FIG. 1 in operation.

DETAILED DESCRIPTION OF THE INVENTION

Figure 1:
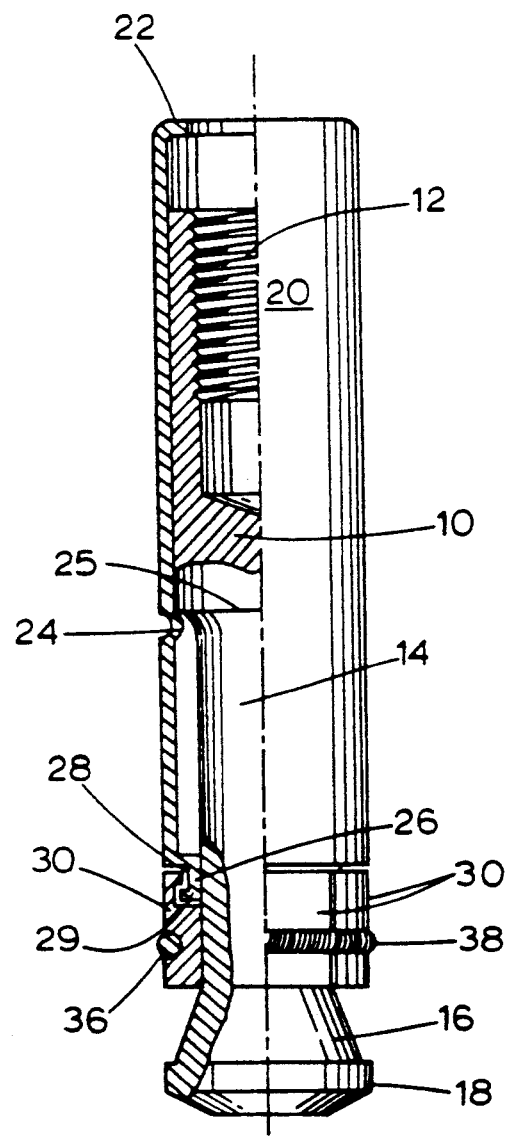
FIG. 1 is a side view partially in axial section of a female anchor according to the invention.

With reference to FIG. 1, the anchor includes a generally cylindrical core 10 having an internal thread 12 extending downwardly from its upper end, a waist portion 14 which is reduced in diameter below the thread 12, and a conical portion 16 which is below the waist and terminates in a flange 18, the conical portion enlarging in the downward direction.

A cylindrical sleeve 20 has a relatively thin wall and telescopically receives the core 10. The sleeve 20 includes a top inward flange 22, an intermediate inward projection 24 for engagement with the shoulder 25 at the upper end of the waist 14, and a bottom end 26 for sliding engagement on the waist 14.

The bottom end 26 has an outer peripheral groove 28 terminating in a lower flange 29, which has an outer diameter smaller than that of the main sleeve portion.

The sleeve 20 is formed by first punching or deforming a flat metal sheet into a desired shape, pressing the punched sheet to form the flanges 22 and 29, the projection 24 and the groove 28, and bending the pressed sheet around the core 10 by pressing or deforming it.

Figure 2:
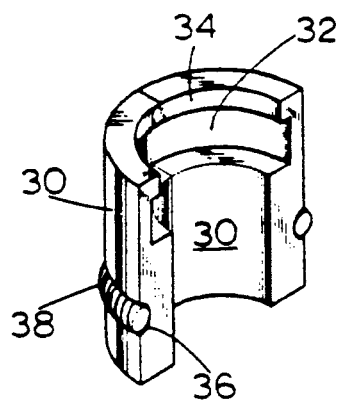
FIG. 2 is an enlarged perspective view of parts of the anchor of FIG. 1.

An annulus is positioned around the waist 14, the annulus being formed by two relatively thick expanders 30, best shown in FIG. 2. Each expander 30 has an inner peripheral groove 32 adjacent its top, which terminates in a top inner flange 34. The flange 34 has an inner diameter larger than the inner diameter of the main expander portion. Each expander 30 also has an outer peripheral groove 36.

The two expanders 30 are attached to the sleeve 20 to form the annulus by engaging the expander flanges 34 with the sleeve flange 29, the flange 34 extending into the groove 28. The expanders 30 are then bound around the core waist 14 by a garter spring 38. Instead, the expanders 30 may be interconnected by a weak adhesive, adhesive tape or the like.

Figure 3:
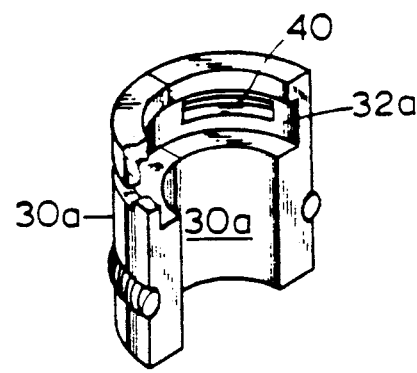
FIGS. 3 and 4 are views similar to FIG. 2 but show alternative embodiments of the invention.

FIG. 3 shows a modified expander 30a design wherein each expander has an inner peripheral groove 32a formed with a hole 40 through it for engagement with an extension of the sleeve 20, which may be formed on the bottom flange of the sleeve.

Figure 4:
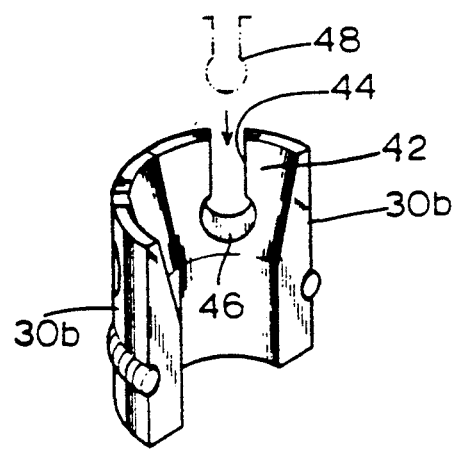

FIG. 4 shows another modified expander 30b design wherein each expander has an upper inner conical wall 42 which tapers upwardly. The tapering upper portion of each expander 30b has a keyhole-shaped recess 44 formed through it. The recess 44 has an open top and an enlarged bottom 46 for engagement with a complementary part 48, which may be formed on the bottom of a sleeve.

In operation, as shown in FIG. 5, the assembled anchor is inserted into a hole 50 having an undercut portion 52 near the bottom thereof in concrete until the lower end of the core 10 reaches the bottom of hole 50. The depth of the hole is sized relative to the length of the anchor such that the top of the sleeve 20 projects from the hole 50 and it is hammered down by a suitable tool. The interconnection between the sleeve 20 and the expanders causes the expanders 30 to slide down along the conical core portion 16.

As shown in FIG. 6, a part 54 to be anchored is connected to the core 10 by a bolt 56 and a washer 58. The tightening of bolt 56 lifts the core 10 from the bottom of hole 50 until the flange 18 on the conical portion 16 engages with the lower ends of the expanders 30, whereby the expanders are constrained between the conical core portion 16 and undercut 52. As a result, the anchor is secured in the hole 50.

In order to pull the anchor out of the hole 50, the bolt 56, washer 58 and body 54 are removed. Then, as shown in FIG. 7, the core 10 is first pressed down by a suitable tool, releasing the undersides of the expanders 30 from constraint. A tool 60 is then engaged with the top flange 22 of the sleeve, and pulled to lift the expanders 30 to the position shown in FIG. 5. Further lifting of tool 60 pulls the anchor out of the hole 50 with the sleeve projection 24 engaging with the core 10.

The expanders 30 can expand with minimum deformation because of the loose connection between the sleeve 20 and the expanders.

The formation of core waist 14 allows the expanders 30 to be thick for better engagement with the conical portion 16 and the undercut 52. The larger diameter of the upper portion of the core 10 enables the thread 12 to have a larger diameter, which accommodates a larger diameter of bolt 56.

Figure 8:
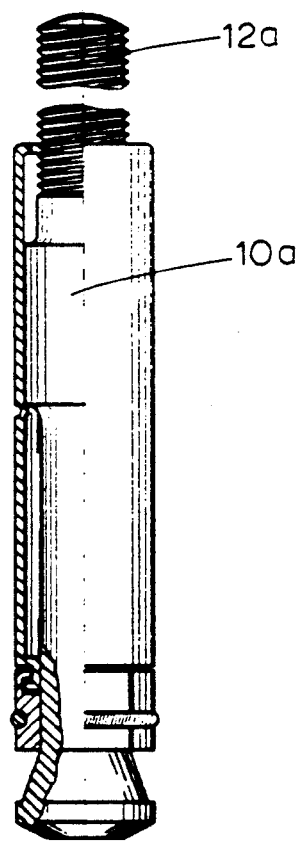
FIG. 8 is a side view partially in axial section of a male anchor according to the invention.

The anchor shown in FIG. 8 is similar to that shown in FIG. 1 but includes a core 10a having an upwardly extending outer thread portion 12a for engagement with a nut (not shown) and a body to be anchored. To hammer the sleeve of FIG. 8 down, a tubular tool (not shown) is needed, which fits around the portion 12a.

What is claimed is:

1. An anchor comprising:
   a core including first and second ends and a cylindrical portion between said ends, said first end including means for engaging with a body to be anchored, and said second end terminating in a portion which is enlarged gradually;
   a sleeve engaging telescopically around said cylindrical portion for moving said core with said sleeve when said sleeve is moved in the direction of said first end of said core;
   expanders normally forming an annulus when positioned together, said annulus engaging slidably with said cylindrical portion, each of said expanders having an engaging and which abuts on and engages with said end of the sleeve, each of said expanders including an inner cylindrical wall for engagement with said portion which is enlarged gradually and including an outer cylindrical wall for engagement with an undercut portion of a hole; and
   means on said expanders for at least provisionally binding them around said core.

2. An anchor according to claim 1, wherein said sleeve has a sleeve flange adjacent said end, and said engaging ends of said expanders including an expander flange for engaging with the sleeve flange.

3. An anchor comprising:
   a core including first and second ends and a cylindrical portion between said ends, said first end including means for engaging with a body to be anchored, and said second end terminating in a portion which is enlarged gradually;
   a sleeve engaging telescopically around said cylindrical portion and having an end adjacent said second end of the core;
   expanders normally forming an annulus when positioned together, said annulus engaging slidably with said cylindrical portion, each of said expanders having an engaging end which abuts on and engages with said end of the sleeve, each of said expanders including an inner cylindrical wall for engagement with said portion which is enlarged gradually and including an outer cylindrical wall for engagement with an undercut portion of a hole; and
   means on said expanders for at least provisionally binding them around said core, said sleeve having an axial projection adjacent said end, said axial projection having an enlarged end, and each of the expanders having a recess for engaging with said enlarged end.

4. An anchor according to any of claims 1, 2 or 3, wherein said expanders have an outer peripheral groove, and said means for binding comprises a spring for engaging said groove.

5. An anchor according to claims 1 or 3, wherein said sleeve has another end which is adjacent said first end of said core, said another end including means for engagement by a tool for removing said anchor from a hole.

6. An anchor according to claim 1, wherein said engaging end of said expanders and said end of said sleeve include interengaging flange means having a close connection and limited movement therebetween.

* * * * *

UNITED STATES PATENT AND TRADEMARK OFFICE
CERTIFICATE OF CORRECTION

PATENT NO. : 5,284,409

DATED : February 8, 1994

INVENTOR(S) : Masaaki MIYANAGA

It is certified that error appears in the above-identified patent and that said Letters Patent is hereby corrected as shown below:

Column 3, line 22, between the words "portion" and "for", the following words are missing:

--and having an end adjacent said second end of the core;

engaging means between said sleeve and said cylindrical portion--

Column 3, line 29, between the words "engaging" and "which", the word "and" should be --end--.

Signed and Sealed this

Thirtieth Day of August, 1994

*Attest:*

BRUCE LEHMAN

*Attesting Officer*    *Commissioner of Patents and Trademarks*